US007822679B1

(12) United States Patent
Vaux et al.

(10) Patent No.: US 7,822,679 B1
(45) Date of Patent: Oct. 26, 2010

(54) METHOD AND SYSTEM FOR CONDUCTING A COMMERCIAL TRANSACTION BETWEEN A BUYER AND A SELLER

(75) Inventors: Jonathan Vaux, San Francisco, CA (US); Brian Triplett, San Ramon, CA (US); Michael Dreyer, Danville, CA (US); Loraine Martin Yeakle, Danville, CA (US); Alistair Duncan, Redwood City, CA (US); Paulo Fernandes, Hayward, CA (US)

(73) Assignees: Visa U.S.A. Inc., Foster City, CA (US); Visa International Service Association, San Francisco, CA (US)

( * ) Notice: Subject to any disclaimer, the term of this patent is extended or adjusted under 35 U.S.C. 154(b) by 2084 days.

(21) Appl. No.: 10/020,466

(22) Filed: Oct. 29, 2001

(51) Int. Cl.
*G06Q 40/00* (2006.01)
(52) U.S. Cl. ........................................ 705/38
(58) Field of Classification Search .................. 705/38
See application file for complete search history.

(56) References Cited

U.S. PATENT DOCUMENTS

| | | |
|---|---|---|
| 3,990,558 A | 11/1976 | Ehrat |
| 4,001,568 A | 1/1977 | Iizuka et al. |
| 4,116,469 A | 9/1978 | Harriman et al. |
| 4,280,037 A | 7/1981 | Schmidhauser |
| D263,638 S | 3/1982 | Donlin |
| 4,325,277 A | 4/1982 | Uchida et al. |
| 4,360,727 A | 11/1982 | Lehmann |
| 4,370,649 A | 1/1983 | Fuerle |
| 4,480,737 A | 11/1984 | Jamgochian et al. |
| 4,545,475 A | 10/1985 | Fillod et al. |
| 4,577,061 A | 3/1986 | Katzeff et al. |

(Continued)

FOREIGN PATENT DOCUMENTS

WO    WO 99/05629    2/1999

(Continued)

OTHER PUBLICATIONS i-Escrow (retrieved on Jul. 30, 2008) retrieved from the internet, <http://web.archive.org/web/19980530021234/http://www.iescrow.com/faq.html#cost> published on May 30, 1998 as per Wayback Engine.

(Continued)

*Primary Examiner*—Daniel S Felten
(74) *Attorney, Agent, or Firm*—Townsend and Townsend and Crew LLP

(57) ABSTRACT

A system for conducting a commercial transaction between a buyer and a seller is disclosed. The system includes a transaction processing system for facilitating payment for a transaction between the buyer and the seller. In addition to the buyer and the seller, the transaction processing system also interacts with an issuer and an acquirer. An electronic invoice relating to the transaction is first posted to the system by the seller or another system. Upon accepting the electronic invoice, the system creates a payment instruction. Each time a payment instruction is created, the system applies certain pre-negotiated payment terms and conditions between the buyer and the seller to the payment instruction. After the payment instruction is created, the system seeks approval from the buyer. Upon approval of the payment instruction by the buyer, the system schedules the payment for the specified date in the payment instruction.

28 Claims, 4 Drawing Sheets

U.S. PATENT DOCUMENTS

| | | |
|---|---|---|
| 4,585,936 A | 4/1986 | Sellier |
| 4,607,335 A | 8/1986 | Mizuno |
| 4,675,515 A | 6/1987 | Lucero |
| 4,713,761 A | 12/1987 | Sharpe et al. |
| 4,796,193 A | 1/1989 | Pitchenik |
| 4,797,540 A | 1/1989 | Kimizu |
| 4,799,156 A | 1/1989 | Shavit et al. |
| 4,822,984 A | 4/1989 | Remery et al. |
| 4,858,121 A | 8/1989 | Barber et al. |
| 4,860,946 A | 8/1989 | Braud |
| 4,864,110 A | 9/1989 | Guillou |
| D304,725 S | 11/1989 | Rose |
| 4,890,228 A | 12/1989 | Longfield |
| 4,893,237 A | 1/1990 | Unno |
| 4,906,826 A | 3/1990 | Spencer |
| 4,920,256 A | 4/1990 | Marty et al. |
| 4,939,351 A | 7/1990 | Alaux et al. |
| 4,947,028 A | 8/1990 | Gorog |
| 4,972,463 A | 11/1990 | Danielson et al. |
| 4,974,878 A | 12/1990 | Josephson |
| 5,003,585 A | 3/1991 | Richer |
| 5,007,084 A | 4/1991 | Materna et al. |
| 5,055,657 A | 10/1991 | Miller et al. |
| 5,056,645 A | 10/1991 | Vidondo |
| 5,134,656 A | 7/1992 | Kudelski |
| 5,136,632 A | 8/1992 | Bernard |
| 5,191,193 A | 3/1993 | Le Roux |
| 5,192,855 A | 3/1993 | Insulander et al. |
| 5,193,057 A | 3/1993 | Longfield |
| 5,216,620 A | 6/1993 | Sansone |
| 5,222,018 A | 6/1993 | Sharpe et al. |
| 5,225,977 A | 7/1993 | Hooper et al. |
| 5,237,159 A | 8/1993 | Stephens et al. |
| 5,255,182 A | 10/1993 | Adams |
| 5,258,906 A | 11/1993 | Kroll et al. |
| 5,269,521 A | 12/1993 | Rossides |
| 5,284,253 A | 2/1994 | Watt et al. |
| 5,285,883 A | 2/1994 | Le Hong et al. |
| 5,289,923 A | 3/1994 | Coblentz et al. |
| 5,291,304 A | 3/1994 | Horii et al. |
| 5,297,030 A | 3/1994 | Vassigh et al. |
| 5,297,674 A | 3/1994 | Birutis et al. |
| 5,305,383 A | 4/1994 | Guillou et al. |
| 5,315,511 A | 5/1994 | Matsuura et al. |
| 5,336,870 A | 8/1994 | Hughes et al. |
| 5,359,183 A | 10/1994 | Skodlar |
| 5,359,509 A | 10/1994 | Little et al. |
| 5,375,172 A | 12/1994 | Chrosny |
| 5,383,113 A | 1/1995 | Kight et al. |
| 5,387,784 A | 2/1995 | Sarradin |
| RE34,872 E | 3/1995 | Lucero |
| 5,403,025 A | 4/1995 | Shanley |
| 5,412,190 A | 5/1995 | Josephson et al. |
| 5,412,191 A | 5/1995 | Baitz et al. |
| 5,412,886 A | 5/1995 | Quinn |
| 5,424,938 A | 6/1995 | Wagner et al. |
| 5,472,116 A | 12/1995 | Barbe et al. |
| 5,478,993 A | 12/1995 | Derksen |
| 5,479,510 A | 12/1995 | Olsen et al. |
| 5,491,325 A | 2/1996 | Huang et al. |
| 5,492,212 A | 2/1996 | Fillod et al. |
| 5,504,677 A | 4/1996 | Pollin |
| 5,532,464 A | 7/1996 | Josephson et al. |
| 5,532,920 A | 7/1996 | Hartrick et al. |
| 5,536,923 A | 7/1996 | Foglino |
| 5,575,374 A | 11/1996 | Orus et al. |
| 5,580,310 A | 12/1996 | Orus et al. |
| 5,583,759 A | 12/1996 | Geer |
| 5,586,036 A | 12/1996 | Pintsov |
| 5,590,196 A | 12/1996 | Moreau |
| 5,590,197 A | 12/1996 | Chen et al. |
| 5,591,949 A | 1/1997 | Bernstein |
| D378,219 S | 2/1997 | Marshlack |
| 5,614,892 A | 3/1997 | Ward, II et al. |
| 5,620,182 A | 4/1997 | Rossides |
| 5,635,695 A | 6/1997 | Feiken |
| 5,637,846 A | 6/1997 | Boers et al. |
| 5,637,848 A | 6/1997 | Lewiner et al. |
| 5,652,786 A | 7/1997 | Rogers |
| 5,655,023 A | 8/1997 | Cordery et al. |
| 5,671,364 A | 9/1997 | Turk |
| D385,304 S | 10/1997 | Griffin |
| 5,675,650 A | 10/1997 | Cordery et al. |
| D386,882 S | 11/1997 | Smith et al. |
| 5,691,524 A | 11/1997 | Josephson |
| 5,697,482 A | 12/1997 | Orus et al. |
| 5,699,528 A | 12/1997 | Hogan |
| 5,704,045 A | 12/1997 | King et al. |
| 5,706,925 A | 1/1998 | Orus et al. |
| 5,715,298 A | 2/1998 | Rogers |
| 5,717,868 A | 2/1998 | James |
| 5,717,989 A | 2/1998 | Tozzoli et al. |
| 5,727,249 A | 3/1998 | Pollin |
| 5,729,460 A | 3/1998 | Plett et al. |
| 5,739,511 A | 4/1998 | Pedersen |
| 5,740,247 A | 4/1998 | Violante et al. |
| 5,748,908 A | 5/1998 | Yu |
| 5,754,655 A | 5/1998 | Hughes et al. |
| 5,757,917 A | 5/1998 | Rose et al. |
| 5,761,308 A | 6/1998 | Torii et al. |
| 5,768,132 A | 6/1998 | Cordery et al. |
| 5,778,067 A | 7/1998 | Jones et al. |
| 5,783,808 A | 7/1998 | Josephson |
| D398,446 S | 9/1998 | Hosea |
| 5,808,723 A | 9/1998 | Klees |
| 5,812,945 A | 9/1998 | Hansen et al. |
| 5,816,174 A | 10/1998 | Smith et al. |
| 5,819,228 A | 10/1998 | Spiro |
| 5,819,236 A | 10/1998 | Josephson |
| 5,819,239 A | 10/1998 | Berson et al. |
| 5,826,241 A | 10/1998 | Stein et al. |
| 5,826,247 A | 10/1998 | Pintsov et al. |
| 5,832,089 A | 11/1998 | Kravitz et al. |
| 5,832,460 A | 11/1998 | Bednar et al. |
| 5,842,183 A | 11/1998 | Delfer, III et al. |
| D403,667 S | 1/1999 | Musha |
| 5,857,152 A | 1/1999 | Everett |
| 5,870,456 A | 2/1999 | Rogers |
| 5,873,072 A | 2/1999 | Kight et al. |
| D406,574 S | 3/1999 | Eckley et al. |
| 5,880,454 A | 3/1999 | Monicault |
| 5,883,810 A | 3/1999 | Franklin et al. |
| 5,884,288 A | 3/1999 | Chang et al. |
| 5,890,137 A | 3/1999 | Koreeda |
| 5,893,902 A | 4/1999 | Transue et al. |
| 5,893,907 A | 4/1999 | Ukuda |
| 5,903,880 A | 5/1999 | Biffar |
| 5,905,976 A | 5/1999 | Mjolsnes et al. |
| 5,907,832 A | 5/1999 | Pieterse et al. |
| 5,909,492 A | 6/1999 | Payne et al. |
| 5,914,472 A | 6/1999 | Foladare et al. |
| 5,924,084 A | 7/1999 | De Rooij |
| 5,930,778 A | 7/1999 | Geer |
| 5,936,219 A | 8/1999 | Yoshida et al. |
| 5,943,656 A | 8/1999 | Crooks et al. |
| 5,946,669 A | 8/1999 | Polk |
| 5,963,921 A | 10/1999 | Longfield |
| 5,963,924 A | 10/1999 | Williams et al. |
| 5,963,925 A | 10/1999 | Kolling et al. |
| 5,966,698 A | 10/1999 | Pollin |
| 5,973,619 A | 10/1999 | Paredes |
| 5,974,145 A | 10/1999 | Feiken |
| 5,974,146 A | 10/1999 | Randle et al. |
| 5,978,780 A | 11/1999 | Watson |

| | | | | | | |
|---|---|---|---|---|---|---|
| 5,978,840 | A | 11/1999 | Nguyen et al. | 6,115,601 | A | 9/2000 | Ferreira |
| 5,983,207 | A | 11/1999 | Turk et al. | 6,119,107 | A | 9/2000 | Polk |
| 5,983,208 | A | 11/1999 | Haller et al. | 6,122,625 | A | 9/2000 | Rosen |
| 5,987,132 | A | 11/1999 | Rowney | 6,125,354 | A | 9/2000 | MacFarlane et al. |
| 5,987,140 | A | 11/1999 | Rowney et al. | 6,129,272 | A | 10/2000 | Yoshida et al. |
| 5,991,411 | A | 11/1999 | Kaufman et al. | 6,135,261 | A | 10/2000 | Noell, Jr. et al. |
| 5,991,412 | A | 11/1999 | Wissenburgh et al. | 6,138,907 | A | 10/2000 | Mori et al. |
| 5,995,626 | A | 11/1999 | Nishioka et al. | 6,163,771 | A | 12/2000 | Walker et al. |
| 5,999,625 | A | 12/1999 | Bellare et al. | 6,167,378 | A | 12/2000 | Webber, Jr. |
| 6,006,199 | A | 12/1999 | Berlin et al. | 6,167,385 | A | 12/2000 | Hartley-Urquhart |
| 6,006,205 | A * | 12/1999 | Loeb et al. ............ 705/34 | 6,169,974 | B1 | 1/2001 | Baumgartner et al. |
| 6,012,048 | A | 1/2000 | Gustin et al. | 6,173,269 | B1 | 1/2001 | Solokl et al. |
| 6,012,740 | A | 1/2000 | Lupi | 6,173,272 | B1 | 1/2001 | Thomas et al. |
| 6,014,646 | A | 1/2000 | Vallee et al. | 6,178,409 | B1 | 1/2001 | Weber et al. |
| 6,016,484 | A | 1/2000 | Williams et al. | 6,181,361 | B1 | 1/2001 | Bluteau et al. |
| 6,016,955 | A | 1/2000 | De Rooij et al. | RE37,067 | E | 2/2001 | Feiken |
| 6,021,943 | A | 2/2000 | Chastain | 6,185,545 | B1 * | 2/2001 | Resnick et al. ............ 705/40 |
| 6,029,150 | A | 2/2000 | Kravitz | 6,193,152 | B1 | 2/2001 | Fernando et al. |
| 6,038,547 | A | 3/2000 | Casto | 6,199,107 | B1 | 3/2001 | Dujari |
| 6,038,548 | A | 3/2000 | Kamil | 6,202,052 | B1 | 3/2001 | Miller |
| 6,041,315 | A | 3/2000 | Pollin | 6,202,054 | B1 | 3/2001 | Lawlor et al. |
| 6,044,362 | A | 3/2000 | Neely | 6,205,433 | B1 | 3/2001 | Boesch et al. |
| 6,047,267 | A | 4/2000 | Owens et al. | 6,205,435 | B1 | 3/2001 | Biffar |
| 6,047,269 | A | 4/2000 | Biffar | 6,205,437 | B1 | 3/2001 | Gifford |
| 6,049,785 | A | 4/2000 | Gifford | 6,206,285 | B1 | 3/2001 | Baitz et al. |
| 6,049,786 | A | 4/2000 | Smorodinsky | 6,216,115 | B1 | 4/2001 | Barrameda et al. |
| 6,052,671 | A | 4/2000 | Crooks et al. | 6,222,914 | B1 | 4/2001 | McMullin |
| 6,052,674 | A | 4/2000 | Zervides et al. | 6,227,447 | B1 | 5/2001 | Campisano |
| 6,056,322 | A | 5/2000 | Lupi | 6,230,148 | B1 | 5/2001 | Pare, Jr. et al. |
| 6,058,380 | A | 5/2000 | Anderson et al. | 6,233,565 | B1 | 5/2001 | Lewis et al. |
| 6,058,382 | A | 5/2000 | Kasai et al. | 6,934,692 | B1 * | 8/2005 | Duncan ............ 705/35 |
| 6,061,665 | A | 5/2000 | Bahreman | | | | |
| 6,062,472 | A | 5/2000 | Cheung | | | | |
| 6,065,675 | A | 5/2000 | Teicher | | | | |
| 6,070,150 | A | 5/2000 | Remington et al. | | | | |
| 6,070,798 | A | 6/2000 | Nethery | | | | |
| 6,072,870 | A | 6/2000 | Nguyen et al. | | | | |
| 6,073,104 | A | 6/2000 | Field | | | | |
| 6,073,113 | A | 6/2000 | Guinan | | | | |
| 6,073,125 | A | 6/2000 | Cordery et al. | | | | |
| 6,076,073 | A | 6/2000 | Pieterse et al. | | | | |
| 6,076,074 | A | 6/2000 | Cotton et al. | | | | |
| 6,076,075 | A | 6/2000 | Teicher | | | | |
| 6,081,790 | A | 6/2000 | Rosen | | | | |
| 6,085,169 | A | 7/2000 | Walker et al. | | | | |
| 6,102,287 | A | 8/2000 | Matyas, Jr. | | | | |
| 6,108,531 | A | 8/2000 | Berg et al. | | | | |
| 6,109,837 | A | 8/2000 | Mausy | | | | |

FOREIGN PATENT DOCUMENTS

| | | |
|---|---|---|
| WO | WO 0118712 | 3/2001 |
| WO | WO 01/33522 A1 | 5/2001 |
| WO | WO 01/57770 A1 | 8/2001 |

OTHER PUBLICATIONS

A communication entitled "Decision to Refuse European Patent Application" dated Dec. 19, 2006 for EP 02778643.3, filed Oct. 25, 2002 (22 pages).

A communication entitled "Summons to Attend Oral Proceedings Pursuant to Rule 71(1) EPC" dated Jun. 2, 2006 for EP 02778643.3, filed Oct. 25, 2002 (5 pages).

US 5,351,994, 10/1994, Pollin (withdrawn)

* cited by examiner

|  | Transaction Fee Term #1 | Transaction Fee Term #2 | Transaction Fee Term #3 |
|---|---|---|---|
| Issuer ID | 1234 | 5678 | 9012 |
| Buyer ID | 95 | 18 | --- |
| Hamilton account (or alias) | 121212 | --- | --- |
| Supplier ID | 22 | 22 | --- |

FIG. 3

METHOD AND SYSTEM FOR CONDUCTING A COMMERCIAL TRANSACTION BETWEEN A BUYER AND A SELLER

BACKGROUND OF THE INVENTION

The present invention generally relates to commercial transactions, and more specifically, to a method and system for conducting a commercial transaction between a buyer and a seller.

In business-to-business transactions, buyers and sellers can establish relationships with one another in a number of different ways. For example, when the transactional volume and/or amount reaches a certain level, a buyer and a seller typically enter into a sales agreement to minimize the risks of exposure and breach by either party. In addition, when a buyer and a seller wish to establish a long-term relationship with one another, they also typically enter into a sales agreement which includes the terms and conditions which govern the rights and obligations of the parties whenever they deal with each other, thereby avoiding the need to negotiate terms and conditions for each transaction on an ad hoc basis.

While sales agreements are routinely used by buyers and sellers to establish contractual relationships with one another, the terms and conditions of a sales agreement typically still need to be reviewed and applied to each transaction manually. In other words, even when a buyer and a seller have established a long-term contractual relationship via execution of a sales agreement, whenever a transaction is to be completed between the parties, both parties still need to manually ensure that the transaction is compliant with the terms and conditions of the sales agreement. The examination of the terms and conditions of the sales agreement is usually done by a human being on an individual basis for each transsection. This manual examination process is often tedious, time-consuming and prone to errors. Therefore, it would be desirable to have a system which is capable of storing and applying in an automated manner the terms and conditions of a sales agreement between a buyer and a seller for transactions conducted between the parties.

Furthermore, a buyer and a seller may have more than one sales agreement between the parties. In fact, as between a buyer and a seller who have a long-term relationship, various types of sales agreements often exist and apply to different types of transactions between the parties. Manually reviewing these various types of sales agreements to determine which specific sale agreement applies to a particular transaction is obviously inefficient. Therefore, it would also be desirable to have a system which is capable of collectively storing and maintaining terms and conditions of sales agreements between a buyer and a seller.

A transaction between a buyer and a seller is typically completed in the following manner. A buyer usually issues a purchase order to a seller for goods and/or services which the buyer wishes to purchase. Upon receipt of the purchase order, the seller ships the goods to the buyer. The seller generally simultaneously forwards an invoice for the amount due when the goods are shipped. It is up to the buyer to honor that invoice and pay within an agreed upon period of time. Payment by the buyer is typically made via check or money transfer. Alternatively, payment can also be made via credit cards or similar credit arrangements.

A normal credit card transaction involves a number of parties, including a buyer who possesses a credit card, a seller, an acquirer, an issuer and a credit card association such as Visa or Mastercard. The acquirer is a business entity, e.g., a commercial bank, that has a business relationship with the seller and receives all the credit card transactions from that seller. The issuer is a business entity which issues the credit card to the buyer. The credit card association such as Visa maintains a network of processing applications, e.g., VisaNet, which facilitates issuance of credit cards and processing of credit card transactions.

A typical credit card transaction involves the following steps. First, the seller calculates the amount of the transaction or purchase and seeks payment from the buyer. The buyer then presents the seller with his/her credit card. The seller then runs the credit card through a point of sale terminal. The point of sale terminal captures credit card and sales information and sends such information together with an authorization request to the acquirer. The acquirer, in turn, processes the information received from the point of sale terminal and forwards any relevant information and the authorization request to the issuer. The issuer processes the relevant information and the authorization request to determine whether the transaction should be authorized. The issuer then sends an approval or denial code back to the acquirer. The acquirer relays the approval or denial code to the point of sale terminal for use by the seller. If the transaction is authorized, the buyer is allowed to consummate the transaction with the seller. Typically, at a later time, the accounts maintained by the issuer and the acquirer are settled and reconciled. The issuer transfers the transaction amount minus a fee to the acquirer. The acquirer then deducts a fee from the amount received from the issuer. The remaining amount is then transferred by the acquirer to the seller's account. A separate fee is charged by the credit card association for use of its network to facilitate the transaction.

Credit card transactions are generally well accepted. Computer systems have been developed to process these transactions in a reliable and secure manner. One such computer system known as VisaNet is developed by Visa to process credit card transactions. Therefore, it would be desirable to have a system which is capable of taking advantage of currently available computing resources thereby further expediting and facilitating transactions between buyers and sellers.

SUMMARY OF THE INVENTION

A system for conducting a commercial transaction between a buyer and a seller is disclosed. The system includes a transaction processing system for facilitating payment for a transaction between the buyer and the seller. In addition to the buyer and the seller, the transaction processing system also interacts with an issuer, an acquirer and a credit card association, such as Visa (via VisaNet). The issuer issues and manages an account for the buyer. The acquirer manages an account for the seller.

Before the transaction processing system is used to process transactions between the buyer and the seller, certain information is obtained from the buyer, the seller, the issuer and the acquirer and stored on the system. Each buyer and seller are registered in the system. Upon registration, the pre-negotiated terms and conditions which are to be used to govern the transactions between the buyer and the seller are collected and stored on the system. Such terms and conditions are obtained, for example, from a sales agreement between the buyer and the seller. In addition, the system also stores pre-negotiated terms and conditions agreed to amongst the buyer, the seller, the issuer and the acquirer.

The transaction processing system handles a transaction between a buyer and a seller in the following exemplary manner. An electronic invoice is first posted to the system by the seller or another system. Upon accepting the electronic invoice, the system creates one or more payment instructions. Each payment instruction corresponds to a payment transaction. Typically, one invoice represents one payment transaction, and hence, one payment instruction is created. However, it should be understood that multiple payment instructions may be created from a single invoice because a single invoice may represent multiple payment transactions. Alternatively, the buyer can cause the system to create a payment instruction without a corresponding electronic invoice.

Each time a payment instruction is created, the system applies some or all of the previously stored pre-negotiated payment terms and conditions between the buyer and the seller to the payment instruction. For example, if terms for a given buyer-seller contract state that payment is due 45 days from invoice date, that information would be included in the payment instruction when the payment instruction is created.

After a payment instruction is created, the system seeks approval from the buyer. The approval can be provided by the buyer through an interface to the system. Alternatively, the approval can be supplied by a third party system on behalf of the buyer. Upon approval of a payment instruction by the buyer, the system schedules the payment for the specified date in the payment instruction. On the scheduled day of payment, the system calculates one or more fees, such as a transaction fee, for that particular payment transaction according to a pre-defined variable pricing matrix, which is determined based on the set of pre-negotiated terms and conditions agreed to by the issuer, the acquirer, the seller and the buyer.

The transaction fee is an amount used by the issuer and the acquirer to compensate each other for processing the payment transaction on behalf of the buyer and the seller. The respective portions of the transaction fee to be received by the issuer and the acquirer may vary. For example, the transaction fee may be shared by the issuer and the acquirer equally or based on some pre-determined percentage, or alternatively, the transaction fee may belong solely to the issuer. After the transaction fee is calculated, information relating to the transaction fee and the payment instruction is formatted into a proper message format(s) and submitted for authorization, clearing and settlement. The issuer and the acquirer then communicate with one another directly or indirectly to settle the funds. Additionally, the system provides transaction and activity reports to all relevant parties as well as access to status information for invoices and payments.

Accordingly, in an exemplary embodiment, a system for executing a payment transaction between a buyer and a seller, comprises: a first interface configured to allow invoices to be submitted for payment; a second interface configured to allow the buyer to receive and approve invoices and create and approve payment instructions; and a transaction processing module configured to handle buyer account(s) and seller account(s) respectively, the transaction processing module is further configured to store a plurality of conditions relating to the buyer, the seller, an issuer and an acquirer; and wherein the transaction processing module enables the issuer and the acquirer to process the invoices in accordance with the plurality of conditions.

Accordingly, in another exemplary embodiment, a method for processing a payment transaction between a buyer and a seller, comprises: maintaining a buyer account and a seller account for the buyer and the seller respectively; maintaining a plurality of terms and conditions relating to the buyer, the seller, an issuer and an acquirer; approving the payment transaction for payment out of the buyer account; determining a transaction fee for the payment transaction based on the plurality of terms and conditions; calculating a net amount using the transaction fee; obtaining payment authorization for the payment transaction from the issuer; and settling the payment transaction between the issuer and the acquirer.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

BRIEF DESCRIPTION OF THE DRAWINGS

FIG. 3 is a diagram illustrating examples of the Transaction Fee Terms and Conditions.

DETAILED DESCRIPTION OF THE INVENTION

Figure 1:
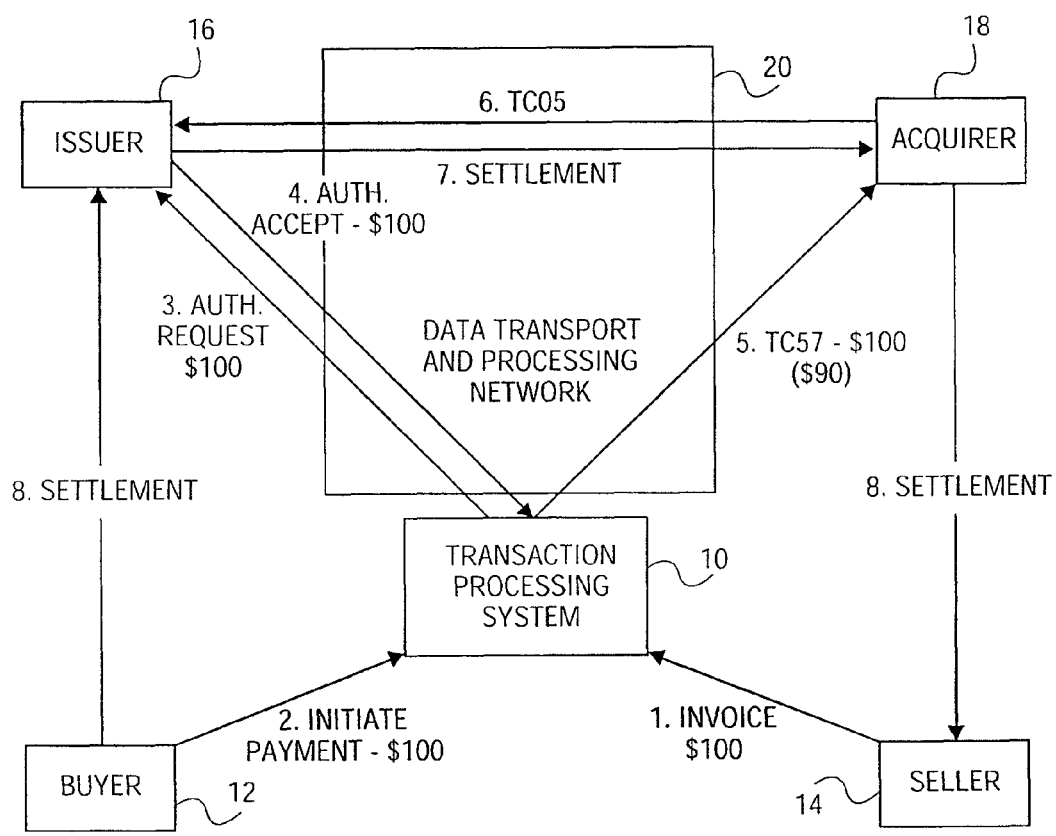
FIG. 1 is a simplified schematic diagram illustrating the process interaction of an exemplary embodiment of the present invention.

Referring to FIG. 1, there is shown the process interaction of an exemplary embodiment of the present invention. According to this exemplary embodiment, a transaction processing system 10 is designed to interact with a number of different parties involved in a transaction including, a buyer 12, a seller 14, an issuer 16, an acquirer 18 and a credit card association, such as Visa (via VisaNet). The buyer 12 can be a person or business entity which has contracted with the seller 14 to purchase goods and/or services.

Similarly, the seller 14 can be a person or business entity which has established a relationship with the buyer 12 to provide goods and/or services to the buyer 12. Such relationship is typically established via a written contract or agreement. For example, the buyer 12 may enter into a contract with the seller 14 on a long-term basis to have the seller 12 be the exclusive provider of office supplies or other commodities for the buyer 12. The relationship between the buyer 12 and the seller 14 will be explained further below.

The issuer 16 can be a business entity which typically is a financial institution such as a bank. The issuer 16 issues one or more transaction accounts to the buyer 12 and is responsible for maintaining and handling the transaction account activities of the buyer 12 in cooperation with the transaction processing system 10. It should be noted that the issuer 16 may issue and maintain transaction accounts for multiple buyers 12.

Similarly, the acquirer 18 can also be a business entity which typically is a financial institution such as a bank. The acquirer 18 is contracted with the seller 14 to accept seller sales drafts and instructions relating to the transaction accounts issued by issuer 16. Furthermore, the acquirer 18 also maintains one or more transaction accounts for the seller 14 and is responsible for maintaining and handling the transaction account activities of the supplier 14 in cooperation with the transaction processing system 10. The acquirer 18 may also maintain similar accounts for multiple sellers 14.

Generally, the transaction processing system 10 stores and manages transaction accounts for buyers 12 and sellers 14 respectively. It should be understood that a single buyer 12 or seller 14 may have multiple transaction accounts from which payment can be debited and/or credited. In addition, the transaction processing system 10 stores and maintains terms and conditions relating to those transaction accounts. These terms and conditions are usually provided to the transaction processing system 10 at the time of registration of the buyer 12 and/or the seller 14. These terms and conditions include, for example, pre-negotiated payment terms and conditions between the buyer 12 and the seller 14, which are to be used to govern transactions between the parties and can be obtained from various sources, such as a sales agreement between the buyer 12 and the seller 14. As will be further explained below, these terms and conditions are selectively used to process the transactions between the buyer 12 and the seller 14.

The transaction processing system 10 also provides the capability to store information relating to the issuers 16 and the acquirers 18. Such information can be used to determine the appropriate amount of transaction fee to be used by the issuer 16 and the acquirer 18 to compensate each other.

Furthermore, the transaction processing system 10 also allows the issuer 16 and the acquirer 18 to create and maintain buyer and seller transaction accounts respectively. In order for the transaction processing system 10 to handle a transaction for the buyer 12 and the seller 14, both the buyer 12 and the seller 14 need to be registered or otherwise have their respective transaction accounts established with the transaction processing system 10. Additional details of the transaction processing system 10 will be further explained below.

The transaction processing system 10 operates in the following exemplary manner. The processing of a single invoice is illustrated below. However, it should be understood that multiple invoices can be processed by the transaction processing system 10 at the same time. As a preliminary step (not shown in FIG. 1), when the buyer 12 decides to purchase goods and/or services from the seller 14, the buyer 12 typically issues a purchase order, or via some other means communicates the purchase order, to the seller 14. Upon receiving the purchase order, the seller 14 then ships the ordered goods or provides a service to the buyer 12.

Referring now to FIG. 1, after receiving the purchase order, the seller 14 issues an electronic invoice either directly or indirectly through a complementary system (e.g., an e-procurement system) to the transaction processing system 10. In an exemplary embodiment, the transaction processing system 10 includes an interface which allows invoices to be posted directly by the seller 14 to the transaction processing system 10.

Upon accepting the invoice, the transaction processing system 10, in turn, creates one or more payment instructions. Each payment instruction corresponds to a payment transaction. Typically, one invoice represents one payment transaction, and hence, one payment instruction is usually created for each invoice. However, it should be understood that multiple payment instructions may be created from a single invoice because a single invoice may represent multiple payment transactions. The payment instruction includes payment terms and conditions between the buyer 12 and the seller 14 which are previously stored on the transaction processing system 10 and relevant to that particular payment transaction. Alternatively, the buyer 12 can cause a payment instruction to be generated by the transaction processing system 10 without any accompanying invoice.

After the payment instruction is created, the transaction processing system 10 seeks approval for that payment instruction from the buyer 12. The approval can be provided by the buyer 12 through an interface to the transaction processing system 10. Alternatively, the approval can be supplied by a third party system on behalf of the buyer 12. Upon approval of the payment instruction by the buyer 12, the transaction processing system 10 schedules the payment for the specified date in the payment instruction.

On the scheduled day of payment, the transaction processing system 10 initiates processing of a payment from a transaction account belonging to the buyer 12 pursuant to the payment instruction.

Upon initiation of processing of the approved payment instruction, the transaction processing system 10 first determines one or more fees, such as a transaction fee, for that particular payment transaction. The transaction fee is an amount used by the issuer 16 and the acquirer 18 to compensate each other for processing the payment transaction. The amount of the transaction fee is determined based on terms and conditions previously agreed to amongst the buyer 12, the seller 14, the issuer 16 and the acquirer 18. Furthermore, the respective portions of the transaction fee to be received by the issuer 16 and the acquirer 18 may vary depending on the arrangement agreed to between the issuer 16 and the acquirer 18. Determination of the transaction fee and these terms and conditions will be further explained below.

Using the transaction fee and other specified fees, if any, the transaction processing system 10 then calculates the net amount to be received by the seller 14 for the payment transaction being processed. Calculation of the net amount will be further described below.

The transaction processing system 10 also prepares an authorization request which is forwarded to the issuer 14 via a data transport and processing network 20, such as VisaNet.

Once the authorization request is approved by the issuer 14, an authorization response is sent by the issuer 14 to the transaction processing system 10. Upon receipt of the authorization response, the transaction processing system 10 forwards a settlement file to the acquirer 18 via the data transport and processing network 20. The settlement file includes, among other information, the invoice amount (gross amount), the transaction fee and the net amount (the gross amount minus the transaction fee and other specified fees, if any).

After the settlement file is received by the acquirer 18, the acquirer 18 issues a request for the transfer of funds. The settlement of funds is then sent from the issuer 16 to the acquirer 18. This settlement of funds between the issuer 16 and the acquirer 18 typically occurs within the data transport and processing network 20. The settlement of funds also occurs between the buyer 12 and the issuer 16 and between the seller 14 and the acquirer 18. More specifically, the buyer 12 forwards or credits the payment amount (or consolidated payments) to the issuer 16 to cover for payment and processing of the payment transaction by the issuer 16 and the acquirer 18 credits the net amount to the seller 14. The settlement of funds between the buyer 12 and the issuer 16 and between the seller 14 and the acquirer 18 occurs outside of the transaction processing system 10.

As shown in FIG. 1, in an exemplary embodiment, the transaction processing system 10 interacts with the data transport and processing network 20 in order to carry out certain payment processing, authorization and/or settlement functions. The data transport and processing network 20 globally connects the processing systems for all participating issuers 16 and acquirers 18. As previously mentioned, an example of the data transport and processing network 20 is VisaNet.

Figure 2:
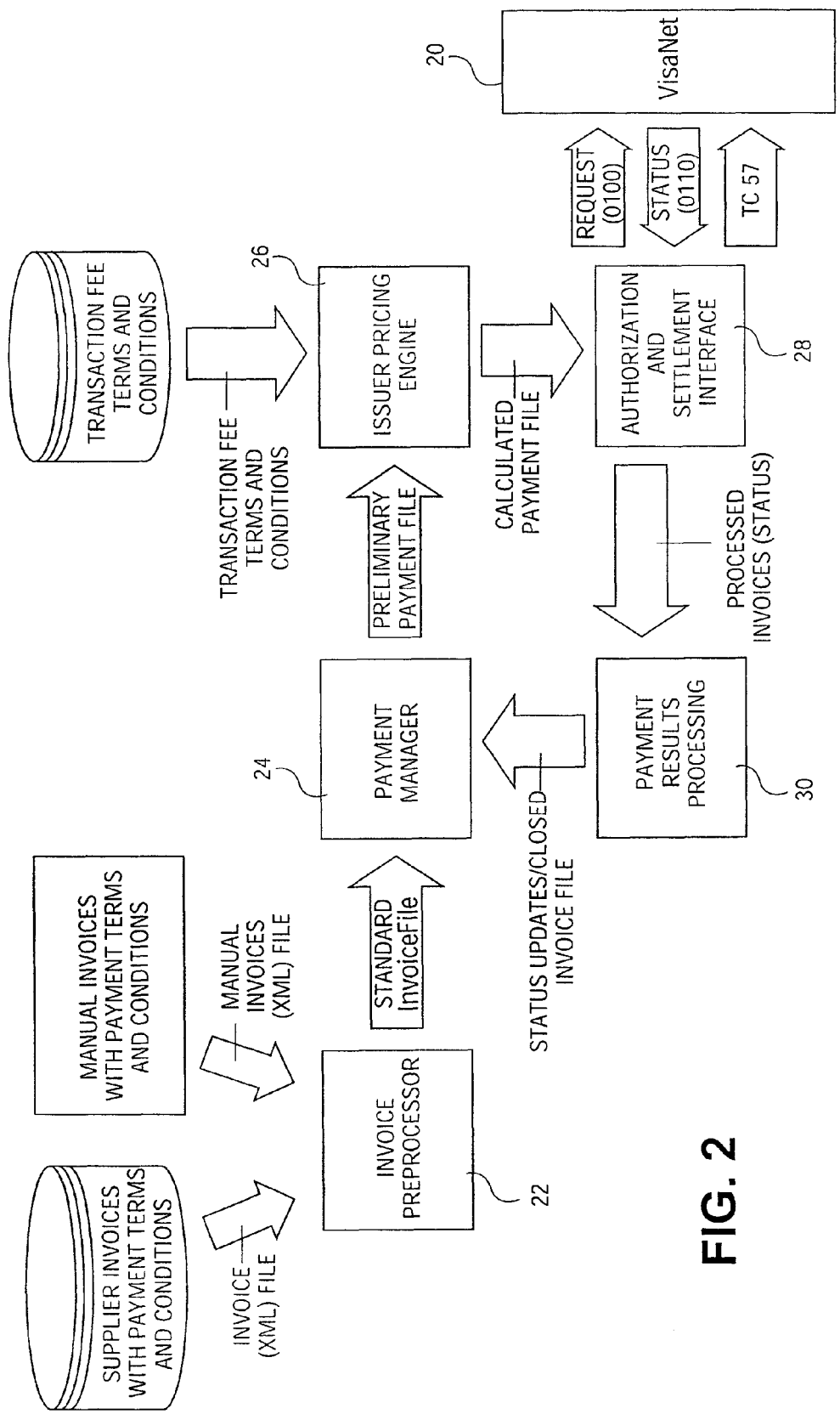
FIG. 2 is a simplified schematic diagram illustrating an exemplary embodiment of the transaction processing system in accordance with the present invention.

Referring to FIG. 2, there is shown an exemplary embodiment of the transaction processing system 10. According to this exemplary embodiment, the transaction processing system 10 includes five components, namely, an invoice preprocessor 22, a payment manager 24, an issuer pricing engine 26, an authorization and settlement interface 28 and a payment results manager 30. Preferably, these five components are implemented in a modular manner; however, it should be understood that they can be implemented in an integral manner as well.

It should also be understood that these five components are provided for illustrative purposes only. The transaction processing system 10 may include any number of components which collectively provide the functionality described herein.

The invoice pre-processor 22 manages input of seller invoices and consolidates these invoices into a standard file format. The invoice pre-processor 22 is capable of accepting seller invoices in an electronic format. Alternatively, the invoice pre-processor 22 may receive invoice data which is manually inputted.

In addition, it should be understood that the term "invoice" as used herein includes a typical invoice and any payment request pursuant to which an amount is to be paid from the buyer 12 to the seller 14. An invoice does not necessarily need to originate from the seller 14 but may be originated from a third party system which issues the invoice on behalf of the seller 14. The buyer 12 cannot create an invoice, but can cause a payment instruction to be created without having received an invoice.

In any event, the invoice pre-processor 22 generates a standardized invoice file which is then forwarded to the payment manager 24. In an exemplary implementation, the invoice pre-processor 22 combines all seller invoices into one standard file to be delivered as input into the payment manager 24.

The payment manager 24 receives the standardized invoice file from the invoice pre-processor 22 and processes the standardized seller invoices. For each invoice, the payment manager 24 creates a corresponding payment instruction. The payment instruction includes certain pre-negotiated payment terms and conditions, if any, between the buyer 12 and the seller 14 which are relevant to the corresponding payment transaction. Alternatively, the buyer 12 can cause a payment instruction to be generated without any accompanying invoice. For example, the pre-negotiated payment terms and conditions may include payment timing information such as 2/10/net 30, etc. Other information can also be included to indicate that payments over a certain amount must be paid faster, or certain types of goods can be paid over a longer period of time, etc. In other words, this enables the buyer 12 to reference important contract terms that do not relate directly to calculating the transaction fee. If no specific set of terms or conditions exists for that particular invoice or payment transaction, then a default set of terms and conditions may be used. It should be noted that the payment manager 24 may contain default sets of terms and conditions for various different buyers 12, sellers 14, issuers 16 and acquirers 18.

After the payment instruction is created, the payment manager 24 seeks approval for that payment instruction from the buyer 12. The approval can be provided by the buyer 12 via an interface to the payment manager 24, or alternatively, the approval can be supplied by a third party system on behalf of the buyer 12. In any event, upon approval of the payment instruction by the buyer 12, the payment manager 24 schedules the payment for the specified date in the payment instruction. On the scheduled day of payment, the payment manager 24 invokes the issuer pricing engine 26 to process the payment transaction, as will be described further below.

The payment manager 24 keeps track of the status of each invoice or payment transaction. Each invoice or payment transaction may assume one of a number of status. A "scheduled" invoice is an invoice which is scheduled for payment on a particular due date. A "pending" invoice is an invoice for which an authorization request has already been issued. A "declined" invoice is an invoice which has been refused by the issuer 16. An "authorized" invoice is an invoice which has been approved by the issuer 16. Finally, a "settled" invoice is an invoice for which settlement fund has already taken place. The payment manager 24 cooperates with the payment results processor 30 to update the status of each pending invoice or payment transaction.

The payment manager 24 further provides various functions and services to the buyer 12, the seller 14, the issuer 16 and the acquirer 18.

With respect to the buyer 12, the payment manager 24 allows the buyer 12 to perform a number of tasks, including, for example, (1) administering users belonging to the buyer 12, such as controlling user access levels and roles with identity authentication; (2) viewing and printing a listing of open invoices; (3) viewing payment terms and conditions for sellers presenting the invoices; (4) approving or rejecting invoices; (5) selecting invoices to pay from list of open invoices; (6) viewing payment status of invoices; (6) creating a payment for a seller if there is no associated invoice; (8) entering or selecting payment variables, such as amount, disbursement account and date, including scheduling in advance for deferred settlement; (9) defining and enforcing payment approval process and authorization levels; (10) placing payments on hold or canceling payments; (11) viewing historical invoice or payment transactions; and (12) downloading invoice or payment data.

With respect to the seller 14, the payment manager 24 allows the seller 14 to create invoices and view the status of relevant invoices and payments.

With respect to the acquirer 18, the payment manager 24 allows the acquirer 18 to create accounts for sellers 14 and their respective users.

With respect to the issuer 16, the payment manager 24 permits the issuer 16 to perform the following exemplary functions, including, for example, (1) entering payment account information for each buyer 12; (2) providing customer service to the buyer 12; and (3) creating accounts for additional buyers 12 and their respective users.

As mentioned above, on the scheduled day of payment, the payment manager 24 invokes the issuer pricing engine 26 to process the payment transactions. More specifically, the issuer pricing engine 26 is invoked to determine one or more fees, such as a transaction fee, associated with each payment transaction. These fees may be pre-negotiated amongst and/or between the various parties including the issuer 16, the acquirer 18, the buyer 12 and the seller 14. For example, the transaction fee is based on several parameters defined among the issuer 16, the acquirer 18, the buyer 12 and the seller 14. These parameters are collectively known as the "Transaction Fee Terms and Conditions." The transaction fee is used by the acquirer 18 and the issuer 16 to compensate each other for each payment transaction. The respective portions of the transaction fee to be received by the issuer 16 and the acquirer 18 may vary depending on the arrangement agreed to between the issuer 16 and the acquirer 18. For example, the issuer 16 and the acquirer 18 may agree with each other to split the transaction fee based on a pre-negotiated percentage, such as 50-50; alternatively, the issuer 16 may be entitled to receive the entire transaction fee.

The Transaction Fee Terms and Conditions are negotiated between several parties, including, for example, (1) the buyer 12 and the seller 14; (2) the issuer 16 and the buyer 12; (3) the acquirer 18 and the seller 14; and (4) the issuer 16 and the acquirer 18. The issuer 16 is preferably responsible for defining, entering and maintaining the Transaction Fee Terms and Conditions using the payment manager 24. The Transaction Fee Terms and Conditions are stored in the issuer pricing engine 26 or another database and are accessible to the relevant parties.

FIG. 3 is a diagram illustrating examples of the Transaction Fee Terms and Conditions. As shown in FIG. 3, for example, Transaction Fee Term #3 applies to every payment transaction for Issuer #9012. For Issuer #1234, Transaction Fee Term #1 only applies if a payment transaction is made between Buyer #95 and Seller #22 using account #121212. For Issuer #5678, since no account is specified, Transaction Fee Term #2 applies to every payment transaction between Buyer #18 and Seller #22. Other examples of the Transaction Fee and Terms and Conditions include a set of five transaction size ranges that apply to a hierarchy of relationships. The set of transaction size ranges may be payments between $0-$500, $501-$1000, $1001-$5000, etc. These ranges can be established by the parties involved. For example, an individual matrix can be established for (1) each buyer and seller relationship, (2) for all sellers to a certain buyer, (3) for all sellers with a relationship to a certain acquirer, etc. Other Transaction Fee and Terms and Conditions may include additional fees for new value added services such as guaranteed payment.

The net amount for each payment transaction is then calculated by subtracting the transaction fee from a gross amount. The gross amount represents the payment amount which is to be paid by the buyer 12 for the payment transaction being processed. Optionally, additional fees may be deducted from the net amount. For example, the acquirer 18 may require the seller 14 to pay other fees in order for the acquirer 18 to handle certain payment transactions on behalf of the seller 14.

Figure 4:
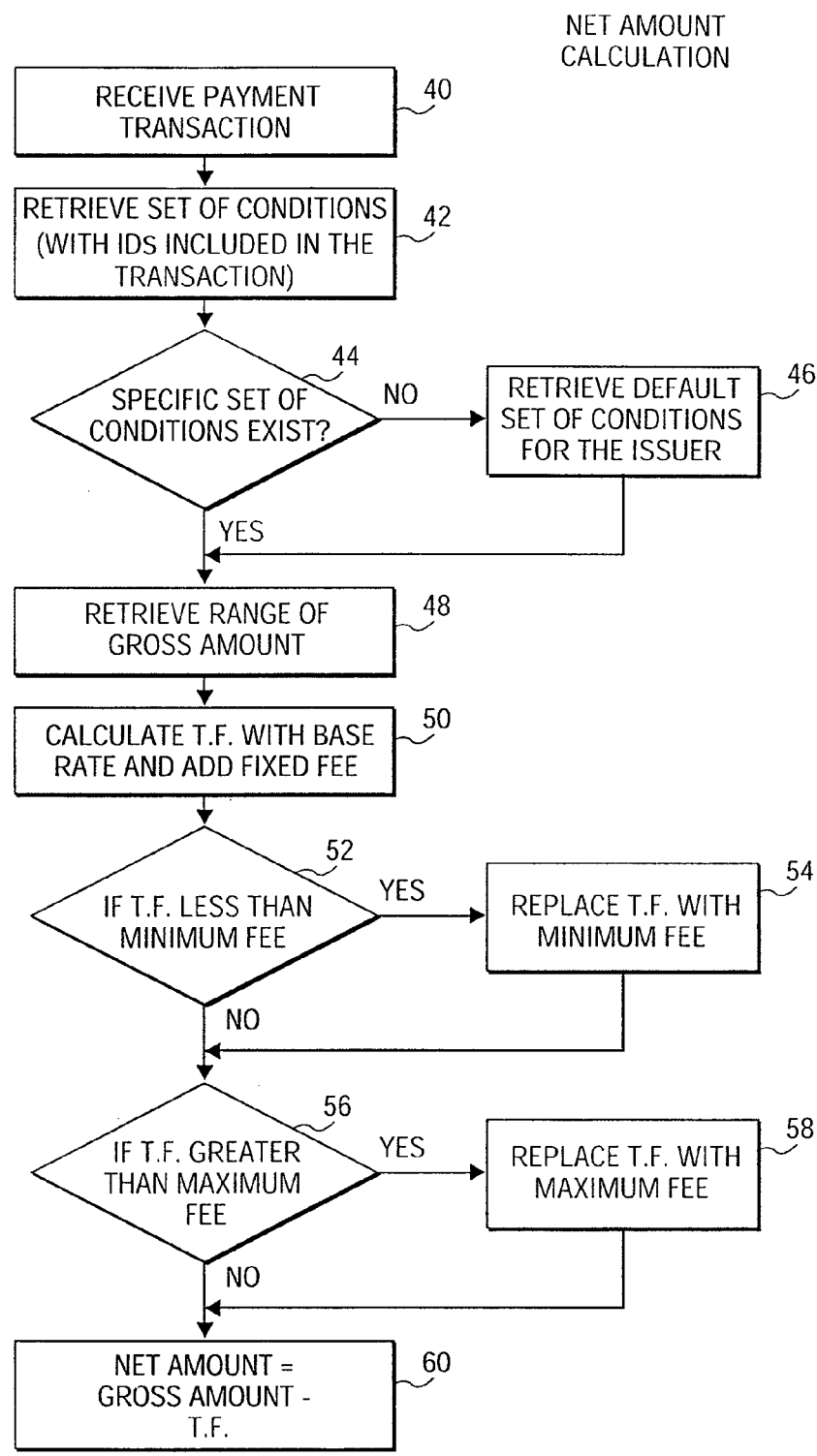
FIG. 4 is a flow diagram illustrating how the net amount for each transaction is calculated in accordance with am exemplary embodiment of the present invention.

FIG. 4 is a flow diagram illustrating how the issuer pricing engine 26 calculates the net amount for each payment transaction. At 40, the issuer pricing engine 26 receives the payment instruction corresponding to the payment transaction to be processed from the payment manager 24. At 42, the issuer pricing engine 26 attempts to retrieve a specific set of terms and conditions associated with that particular payment transaction for use in calculating the transaction fee. At 44, if a specific set of terms and conditions does not exist, a default set of terms and conditions may be retrieved at 46. In any event, the set of terms and conditions include information, such as pricing parameters, which is used to calculate the transaction fee.

At 48, for example, the transaction size ranges and their associated pricing factors are obtained from within the retrieved set of terms and conditions. Each range may have different pricing factors. For example, the pricing factor for the range of $0-$500 may be a basis rate which is based purely on percent calculation, such as 1.5% of the gross amount; the pricing factor for the range of $501 to $632 may be 1% of the gross amount plus a flat fee of $5; the pricing factor for the range of $633 to $999 may be purely a flat fee, etc. At 50, the transaction fee is calculated by applying the appropriate pricing factor against the gross amount. As described above, the pricing factor may include a basis rate or percentage only, flat fee only or combination of the two with specific and defined values. It should be understood that other formulations or criteria may be used as the appropriate pricing factor.

At 52, the issuer pricing engine 26 determines whether the transaction fee is less than a minimum fee. The minimum fee is part of the negotiated fees in the variable pricing negotiation between issuers, acquirers, etc. At 54, if it is determined that the transaction fee is less than the minimum fee, then the minimum fee is used as the transaction fee.

At 56, the issuer pricing engine 26 further determines whether the transaction fee exceeds a maximum fee. The maximum fee is also part of the negotiated fees in the variable pricing negotiation between issuers, acquirers, etc. If the transaction fee exceeds the maximum fee, then, at 58, the maximum fee is used as the transaction fee. At 60, the net amount is calculated by subtracting the transaction fee from the gross amount. For each payment transaction, the gross amount is the payment amount to be paid by the buyer 12, the transaction fee is the amount used by the acquirer 18 and the issuer 16 to compensate each other. The net amount is the amount to be received by the seller 14. Optionally, other fees may be deducted from the net amount. For example, the acquirer 18 may require the seller 14 to pay additional fees for processing of certain specified payment transactions.

Once the relevant amounts, such as the transaction fee and the net amount, are calculated, they are consolidated with other information into a calculated payment file for delivery to the authorization and settlement interface 28. The calculated payment file is stored on an archive database or other storage medium for archival and reporting purposes.

The authorization and settlement interface 28 is responsible for transmitting and receiving payment transaction authorization and/or settlement information to and from the data transport and processing network 20. For each payment transaction, the data transport and processing network 20 determines whether such transaction is authorized (by the issuer 16). Authorization and/or settlement results are then provided to the authorization and settlement interface 28.

The payment results manager 30 then receives the authorization and/or settlement results from the authorization and settlement interface 28 and further processes the results. The processed results are then passed back to the payment manager 24. The payment manager 24 then updates the status of the invoices or payment transactions and allows users to see whether payments for invoices have been settled or have been declined.

In an exemplary embodiment, the transaction processing system 10 is implemented on a server which is accessible via a computer network, such as the Internet. Based on the disclosure provided herein, a person of ordinary skill in the art will know of ways and methods to implement the transaction processing system 10 on a server or other configuration.

Furthermore, in order to facilitate access by various users, the transaction processing system 10 also includes a number of user interfaces. The user interfaces allow different users to view and/or modify different information or data residing on the transaction processing system 10 depending on the access authority of such users. For example, an issuer 16 via a user interface may be able to view and modify certain Transaction Fee Terms and Conditions relating to its buyers 12. A buyer 12 via another user interface may be able to view invoices issued by its sellers 14. A person of ordinary skill in the art will know of other ways and methods to implement user interfaces via a computer network which allow information and data to be accessed.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A method for processing invoices submitted by sellers to buyers, comprising:
   using a server in a transaction processing system, maintaining buyer accounts and seller accounts for the buyers and the sellers respectively; and
   using the server, maintaining a plurality of terms and conditions relating to the buyers, the sellers, issuers and acquirers;
   with respect to each invoice, performing the following:
      identifying the involved buyer, seller, issuer and acquirer;
      determining one or more fees based on portions of the plurality of terms and conditions relating to the involved buyer, seller, issuer and acquirer;
      calculating a net amount using the transaction fee;
      obtaining payment authorization from the involved issuer; and
      upon obtaining the payment authorization, settling payment of the invoice between the involved issuer and acquirer,
   wherein the transaction processing system comprises a variable pricing matrix, which calculates one or more transaction fees based on a set of pre-negotiated terms and conditions agreed to by at least the issuer and the acquirer.

2. The method of claim 1 further comprising:
   upon settling payment of the invoices, updating the buyer accounts and the seller accounts.

3. A method of conducting a transaction between a buyer and a seller, the method comprising:
   receiving an electronic invoice or an instruction to create the electronic invoice from the seller at a transaction processing system;
   transmitting a payment instruction from the transaction processing system to the buyer;
   receiving approval from the buyer in response to the sent payment instruction at the transaction processing system;
   after receiving the approval from the buyer, sending an authorization request to an issuer;
   after sending the authorization request, receiving an authorization response from the issuer at the transaction processing system, wherein funds are thereafter transferred from the issuer to an acquirer using a payment processing network; and
   updating a status of the electronic invoice with information regarding whether the invoice has been settled or declined.

4. The method of claim 3 wherein the transaction processing system comprises a payment manager that keeps track of the status of each invoice or payment transaction.

5. The method of claim 3 wherein the payment instruction is created based on terms and conditions that were previously negotiated by the buyer and the seller.

6. The method of claim 3 wherein after receiving approval from the buyer, goods are shipped from the seller to the buyer.

7. The method of claim 3 wherein the transaction processing system is associated with a credit card association.

8. The method of claim 3 wherein the payment instruction is sent in accordance with terms or conditions set by the buyer, the seller, or the buyer and the seller.

9. The method of claim 3 wherein the transaction processing system provides for a variable fee schedule.

10. The method of claim 3 wherein the transaction processing system provides for a fee, depending on a value of the transaction conducted between the buyer and the seller.

11. A system for conducting a transaction between a buyer and a seller, the system comprising:
    a transaction processing system, wherein the transaction processing system is in communication with a buyer and a seller, and wherein the transaction processing system comprises an invoice preprocessor and a payment manager; and
    a data transport and processing network coupled to the transaction processing system, wherein the data transport and processing network is in communication with an issuer,
    wherein the transaction processing system comprises an issuer pricing engine, wherein the issuer pricing engine is configured to determine a transaction fee associated with an invoice associated with the transaction, the issuer retaining at least a portion of the transaction fee.

12. The system of claim 11 wherein the data transport and processing network facilitates interaction between various buyers and sellers.

13. The system of claim 11 wherein the transaction processing system includes an authorization and settlement interface.

14. The system of claim 11 wherein the transaction processing system further comprises a database including invoices with terms and conditions.

15. The system of claim 11 wherein the transaction processing system comprises a database comprising a table including transaction fees that are assessed depending upon terms and conditions in invoices.

16. The system of claim 11 wherein the transaction processing system comprises a variable pricing matrix, which calculates one or more transaction fees based on a set of pre-negotiated terms and conditions agreed to by at least the issuer and an acquirer associated with the seller.

17. The system of claim 11 wherein the transaction processing system creates or receives invoices from sellers.

18. The system of claim 11 wherein the transaction processing system is configured to create a settlement file for the transaction between the buyer and the seller.

19. The system of claim 11 wherein the transaction processing system is configured to create a settlement file for the transaction between the buyer and the seller and wherein the settlement file includes information regarding the cost of goods sold.

20. The system of claim 12 wherein the transaction processing system includes an authorization and settlement interface.

21. The system of claim 20 wherein the transaction processing system further comprises a database including invoices with terms and conditions.

22. The system of claim 21 wherein the transaction processing system comprises a database comprising a table including transaction fees that are assessed depending upon terms and conditions in invoices.

23. The system of claim 22 wherein the transaction processing system comprises a variable pricing matrix, which calculates one or more transaction fees based on a set of pre-negotiated terms and conditions agreed to by at least the issuer and an acquirer associated with the seller.

24. The system of claim 23 wherein the transaction processing system creates or receives invoices from sellers.

25. The system of claim 24 wherein the settlement file includes information regarding the cost of goods sold.

26. The method of claim 3 wherein the payment processing network is a data transport and processing network.

27. The method of claim 26 wherein the method further comprises creating and transmitting multiple payment instructions for the electronic invoice.

28. The method of claim 26 wherein the transaction processing system comprises an invoice preprocessor and a payment manager.

* * * * *